(12) United States Patent
Gill

(10) Patent No.: US 7,171,741 B2
(45) Date of Patent: Feb. 6, 2007

(54) METHOD FOR EXTENDED SELF-PINNED LAYER FOR A CURRENT PERPENDICULAR TO PLANE HEAD

(75) Inventor: Hardayal Singh Gill, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 478 days.

(21) Appl. No.: 10/627,546

(22) Filed: Jul. 25, 2003

(65) Prior Publication Data
US 2005/0018362 A1    Jan. 27, 2005

(51) Int. Cl.
*G11B 5/187* (2006.01)
(52) U.S. Cl. .............. 29/603.14; 29/603.07; 29/603.13; 360/314; 360/324.11; 360/324.12
(58) Field of Classification Search ......... 29/603.07, 29/603.08, 603.13, 603.14; 360/313, 314, 360/320, 324, 324.11, 324.12
See application file for complete search history.

(56) References Cited

U.S. PATENT DOCUMENTS 5,768,069 A * 6/1998 Mauri ................... 360/314
6,271,997 B1 * 8/2001 Gill ................... 360/324.12 X
6,407,890 B1 * 6/2002 Gill ....................... 360/324 X

FOREIGN PATENT DOCUMENTS

EP        0 628 835       * 12/1994

* cited by examiner

*Primary Examiner*—A. Dexter Tugbang
(74) *Attorney, Agent, or Firm*—David W. Lynch, Esq.; Chambliss, Bahner & Stophel, P.C.

(57) ABSTRACT

A Giant Magneto-Resistive (GMR) sensor (900) having Current Perpendicular to Plane (CPP) structure is formed providing an extended first pinned layer (914) as compared to second pinned layer (912) and free layer (910). Increased magnetoresistance changes, increased pinning strength, increased thermal stability, and decreased susceptibility to Electro-Static Discharge (ESD) events is realized by maintaining equivalent current densities through free layer (910) and second pinned layer (912), while decreasing the relative current density through first pinned layer (914).

11 Claims, 8 Drawing Sheets

METHOD FOR EXTENDED SELF-PINNED LAYER FOR A CURRENT PERPENDICULAR TO PLANE HEAD

BACKGROUND OF THE INVENTION

1. Field of the Invention

This invention relates in general to spin valve heads for magnetic storage systems, and more particularly to a method and apparatus for an extended self-pinned layer for a Current Perpendicular to Plane (CPP) head.

2. Description of Related Art

Magnetic recording is a key and invaluable segment of the information-processing industry. While the basic principles are one hundred years old for early tape devices, and over forty years old for magnetic hard disk drives, an influx of technical innovations continues to extend the storage capacity and performance of magnetic recording products. For hard disk drives, the areal density or density of written data bits on the magnetic medium has increased by a factor of more than two million since the first disk drive was applied to data storage. Since 1991, areal density has grown by a 60% compound growth rate, which is based on corresponding improvements in heads, media, drive electronics, and mechanics.

Magnetic recording heads have been considered the most significant factor in areal-density growth. The ability of the magnetic recording heads to both write and subsequently read magnetically recorded data from the medium at data densities well into the Gigabits per Square Inch (Gbits/in$^2$) range gives hard disk drives the power to remain the dominant storage device for many years to come.

Important components of computing platforms are mass storage devices including magnetic disk and magnetic tape drives, where magnetic tape drives are popular, for example, in data backup applications. The magnetic disk drive includes a rotating magnetic disk, write and read heads that are suspended by a suspension arm above the rotating magnetic disk and an actuator that swings the suspension arm to place the read and write heads over selected circular tracks on the rotating disk. The read and write heads are directly mounted on a slider that has an Air-Bearing Surface (ABS) between the slider and the rotating disk. The suspension arm biases the slider into contact with the surface of the magnetic disk when the magnetic disk is not rotating. However, when the magnetic disk rotates, air is swirled by the rotating disk adjacent to the ABS causing the slider to ride on a cushion of air just above the surface of the rotating magnetic disk. The write and read heads are employed for writing magnetic data to and reading magnetic data from the rotating disk. The read and write heads are connected to processing circuitry that operates according to a computer program to implement the write and read functions.

A magnetoresistive (MR) sensor detects magnetic field signals through the resistance changes of a sensing element as a function of the strength and direction of magnetic flux being sensed by the sensing element. Conventional MR sensors, such as those used as MR read heads for reading data in magnetic recording disk and tape drives, operate on the basis of the anisotropic magnetoresistive (AMR) effect of the bulk magnetic material, which is typically a permalloy. A component of the read element resistance varies as the square of the cosine of the angle between the magnetization direction in the read element and the direction of sense current through the read element. Recorded data can be read from a magnetic medium, such as the magnetic disk in a magnetic disk drive, because the external magnetic field from the recorded magnetic medium (the signal field) causes a change in the direction of magnetization in the read element, which in turn causes a change in resistance of the read element and a corresponding change in the sensed current or voltage.

In the past several years, prospects of increased storage capacity have been made possible by the discovery and development of sensors based on the giant magnetoresistance (GMR) effect, also known as the spin-valve effect. In the spin valve sensor, the GMR effect varies as the cosine of the angle between the magnetization of the pinned layer and the magnetization of the free layer. Recorded data can be read from a magnetic medium because the external magnetic field from the recorded magnetic medium, or signal field, causes a change in the direction of magnetization of the free layer, which in turn causes a change in the resistance of the spin valve sensor and a corresponding change in the sensed current or voltage.

Magnetic sensors utilizing the GMR effect are found in mass storage devices such as, for example, magnetic disk and tape drives and are frequently referred to as spin-valve sensors. The spin-valve sensors being divided into two main categories, the Anti-FerroMagnetically (AFM) pinned spin valve and the self-pinned spin valve. An AFM pinned spin valve comprises a sandwiched structure consisting of two ferromagnetic layers separated by a thin non-ferromagnetic layer. One of the ferromagnetic layers is called the pinned layer because it is magnetically pinned or oriented in a fixed and unchanging direction by an adjacent AFM layer, commonly referred to as the pinning layer, which pins the magnetic orientation of the pinned layer through anti-ferromagnetic exchange coupling. The other ferromagnetic layer is called the free or sensing layer because the magnetization is allowed to rotate in response to the presence of external magnetic fields.

In the self-pinned spin valve, the magnetic moment of the pinned layer is pinned in the fabrication process, i.e.—the magnetic moment is set by the specific thickness and composition of the film. The self-pinned layer may be formed of a single layer of a single material or may be a composite layer structure of multiple materials. It is noteworthy that a self-pinned spin valve requires no additional external layers applied adjacent thereto to maintain a desired magnetic orientation and, therefore, is considered to be an improvement over the anti-ferromagnetically pinned spin valve.

Recent hard disk drive designs have utilized the Current In-Plane (CIP) head, where the sense current travels between the magnetic shields parallel to the sensor plate. Such a design yields optimism to suffice up to areal densities close to 100 Gbits/in$^2$, however, research efforts continue to find even better read heads so that areal densities may be boosted into the many hundreds of Gbits/in$^2$ range.

One such discovery is the Current Perpendicular to Plane (CPP) head, whereby the sense current travels from one magnetic shield to the other, perpendicular to the sensor plate. The CPP head provides an advantage over the CIP head because as the sensor size becomes smaller, the output voltage of a CPP head becomes larger, thus providing an output voltage that is inversely proportional to the square root of the sensor area.

One of the candidates for realizing high sensitivity using the CPP structure is the Tunnel-Magneto-Resistive (TMR) head. In a TMR head, the magnitude of the tunneling current, in the gap between two ferromagnetic metals, is dependent upon the electron's spin directions or polarizations. The TMR head, however, has several disadvantages including a large resistance due to the barrier layer, which limits the operating frequency and makes the Johnson and Shot noise high. A breakthrough in fabrication technology is thus required to lower the resistance of the barrier layer before the TMR head becomes a viable CPP option.

Another candidate for the CPP structure uses a multilayer GMR structure that exhibits a large output signal, but has other problems such as the generation of hysteresis and the magnetic domains of their read elements are difficult to control. Moreover, if in-gap type read heads are used for high-density recording, the sensor films must be thinner than the read gap.

Other candidates for the CPP structure use a Spin Valve (SV) arrangement for ultra-high density recording. However, the MR ratio of a CPP element having a conventional SV is a very low percentage and its output voltage, which is related to the resistance change, is too low.

It can be seen therefore, that there is a need for an improved CPP head structure utilizing the SV that exhibits an increased magnetoresistance change, while maintaining control of its magnetic domain.

SUMMARY OF THE INVENTION

To overcome the limitations in the prior art described above, and to overcome other limitations that will become apparent upon reading and understanding the present specification, the present invention discloses a method and apparatus for extending the self-pinned layer of a CPP GMR structure to enhance pinning strength, thermal stability, and magnetoresistance effects.

In one embodiment of the present invention, a method of forming a spin valve sensor is provided. The method comprises forming a pinned layer that includes a first pinned layer having a first magnetic orientation and a first width and a second pinned layer having a second magnetic orientation anti-parallel to the first magnetic orientation. The method further comprises forming a sensing layer having a second width, where the first width is wider than the second width.

These and various other advantages and features of novelty which characterize the invention are pointed out with particularity to the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a method in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiments in which the invention may be practiced. It is to be understood that other embodiments may be utilized as structural changes may be made without departing from the scope of the present invention.

The present invention provides a method and apparatus that extends the pinned layer of a CPP GMR structure in relation to its free layer. In so doing, increased pinning strength is realized by maximizing magnetostriction and compressive stress thus increasing thermal stability. Further, the CPP GMR structure according to the present invention increases the change in magnetoresistance through the use of the extended pinned layer, while decreasing its susceptibility to electrostatic discharge events.

Figure 1:
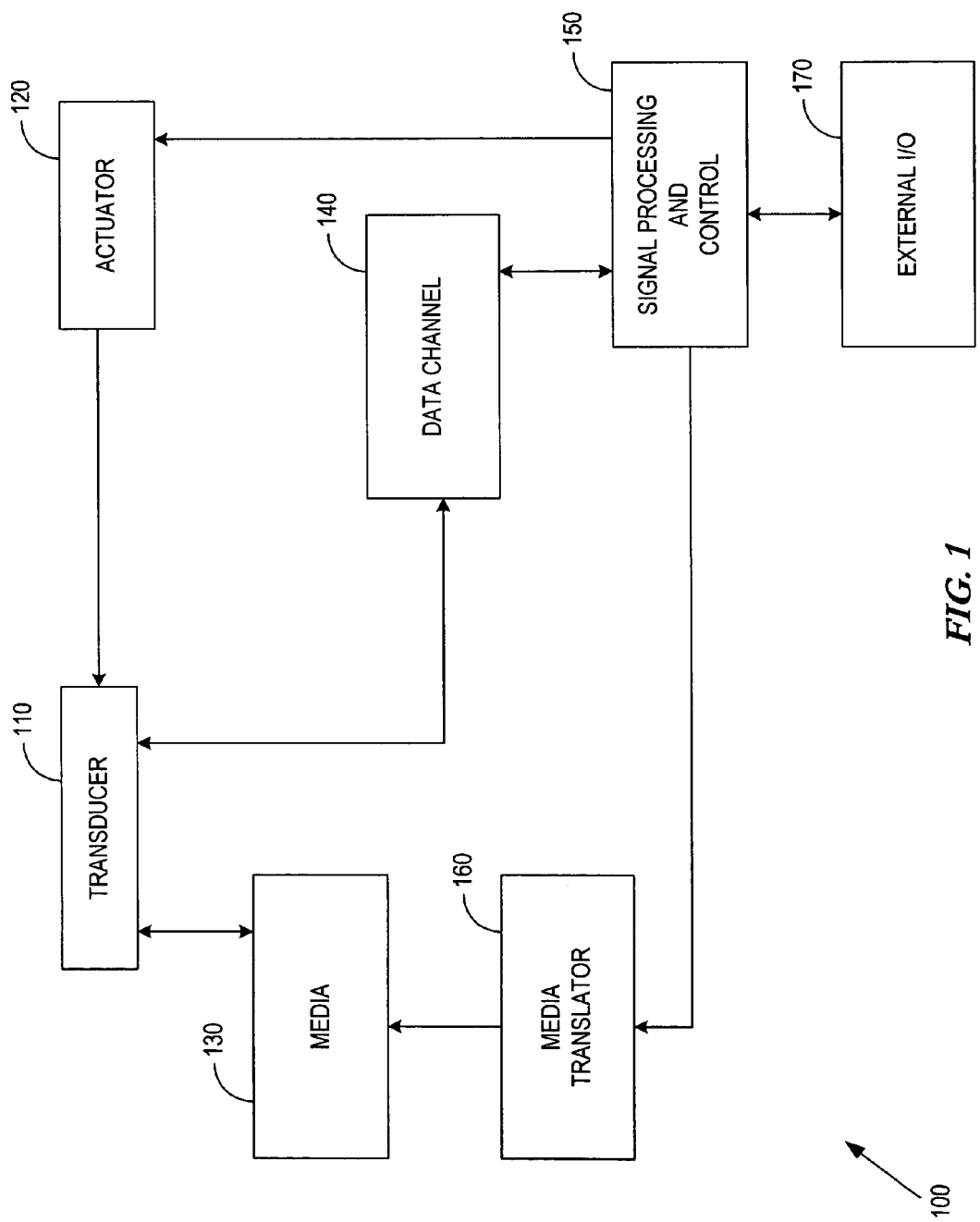
FIG. 1 illustrates a storage system according to the present invention.

FIG. 1 illustrates an exemplary storage system 100 according to the present invention. A transducer 110 is under control of an actuator 120, whereby the actuator 120 controls the position of the transducer 110. The transducer 110 writes and reads data on magnetic media 130. The read/write signals are passed to a data channel 140. A signal processor 150 controls the actuator 120 and processes the signals of the data channel 140 for data exchange with external Input/Output (I/O) 170. I/O 170 may provide, for example, data and control conduits for a desktop computing application which utilizes storage system 100. In addition, a media translator 160 is controlled by the signal processor 150 to cause the magnetic media 130 to move relative to the transducer 110. The present invention is not meant to be limited to a particular type of storage system 100 or to the type of media 130 used in the storage system 100.

Figure 2:
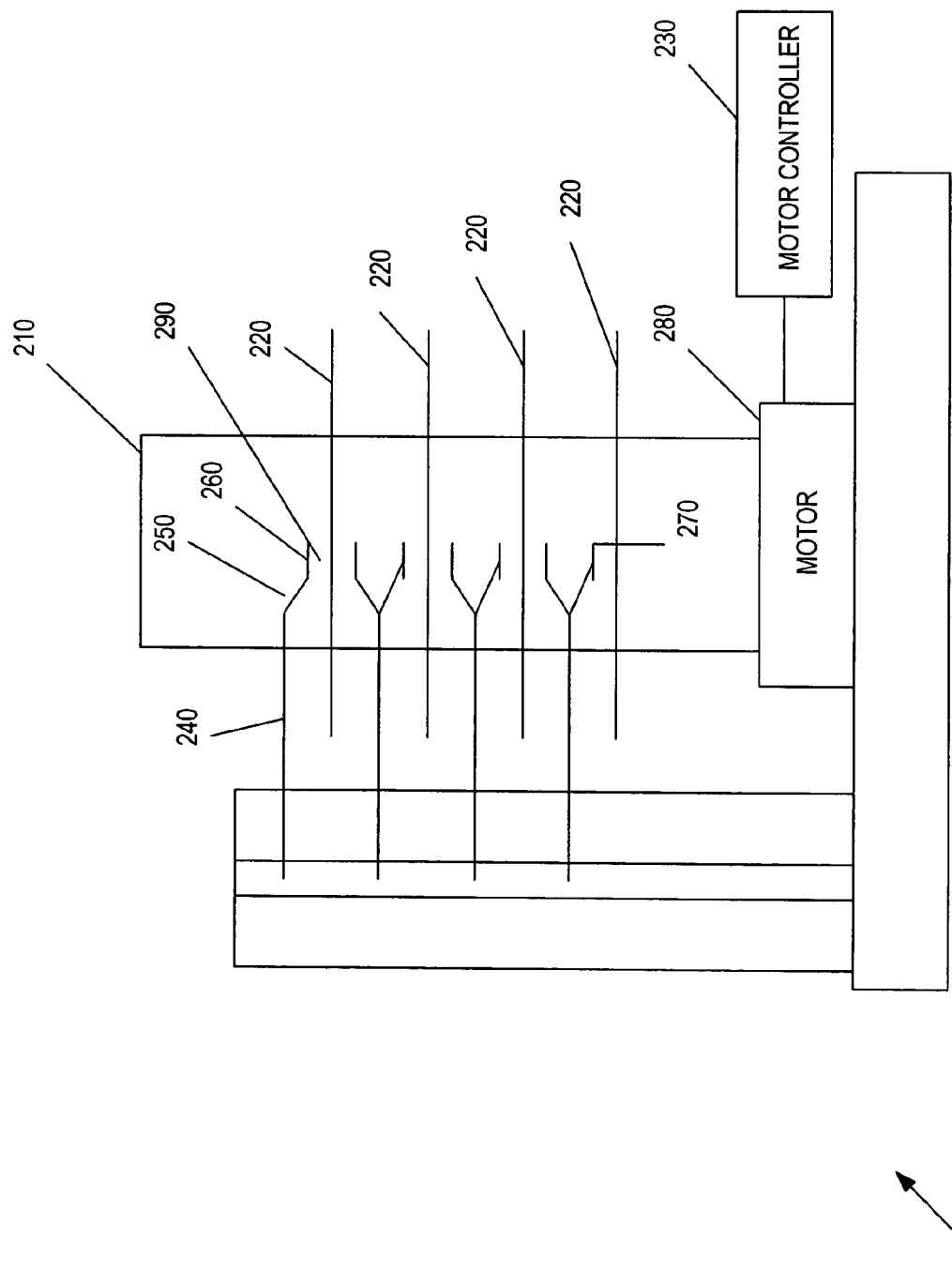
FIG. 2 illustrates one particular embodiment of a storage system according to the present invention.

FIG. 2 illustrates one particular embodiment of a multiple magnetic disk storage system 200 according to the present invention. In FIG. 2, a hard disk drive storage system 200 is shown. The system 200 includes a spindle 210 that supports and rotates multiple magnetic disks 220. The spindle 210 is rotated by motor 280 that is controlled by motor controller 230. A combined read and write magnetic head 270 is mounted on slider 260 that is supported by suspension 250 and actuator arm 240. Processing circuitry exchanges signals that represent information with read/write magnetic head 270, provides motor drive signals for rotating the magnetic disks 220, and provides control signals for moving the slider 260 to various tracks. Although a multiple magnetic disk storage system is illustrated, a single magnetic disk storage system is equally viable in accordance with the present invention.

The suspension 250 and actuator arm 240 position the slider 260 so that read/write magnetic head 270 is in a transducing relationship with a surface of magnetic disk 220. When the magnetic disk 220 is rotated by motor 280, the slider 240 is supported on a thin cushion of air, i.e., air bearing, between the surface of disk 220 and the ABS 290. Read/write magnetic head 270 may then be employed for writing information to multiple circular tracks on the surface of magnetic disk 220, as well as for reading information therefrom.

Figure 3:
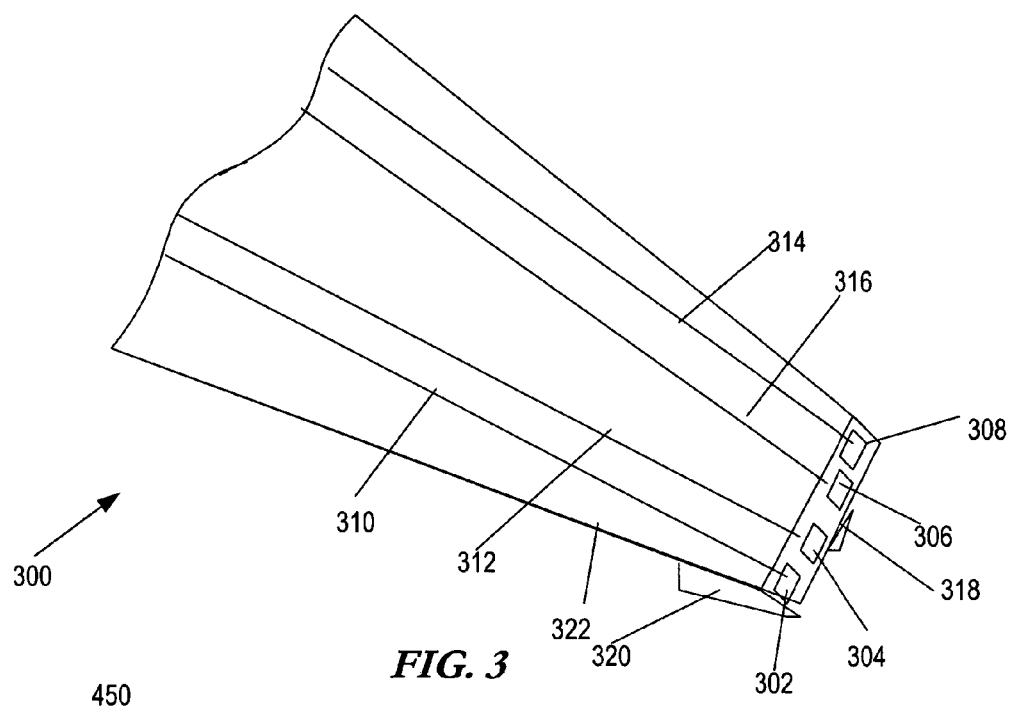
FIG. 3 illustrates a slider mounted on a suspension.

FIG. 3 illustrates slider/suspension combination 300 having a slider 320 mounted on a suspension 322. First and second solder connections 302 and 308 connect leads from the sensor 318 to leads 310 and 314, respectively, on suspension 322 and third and fourth solder connections 304 and 306 connect to the write coil (not shown) to leads 312 and 316, respectively, on suspension 322.

Figure 4:
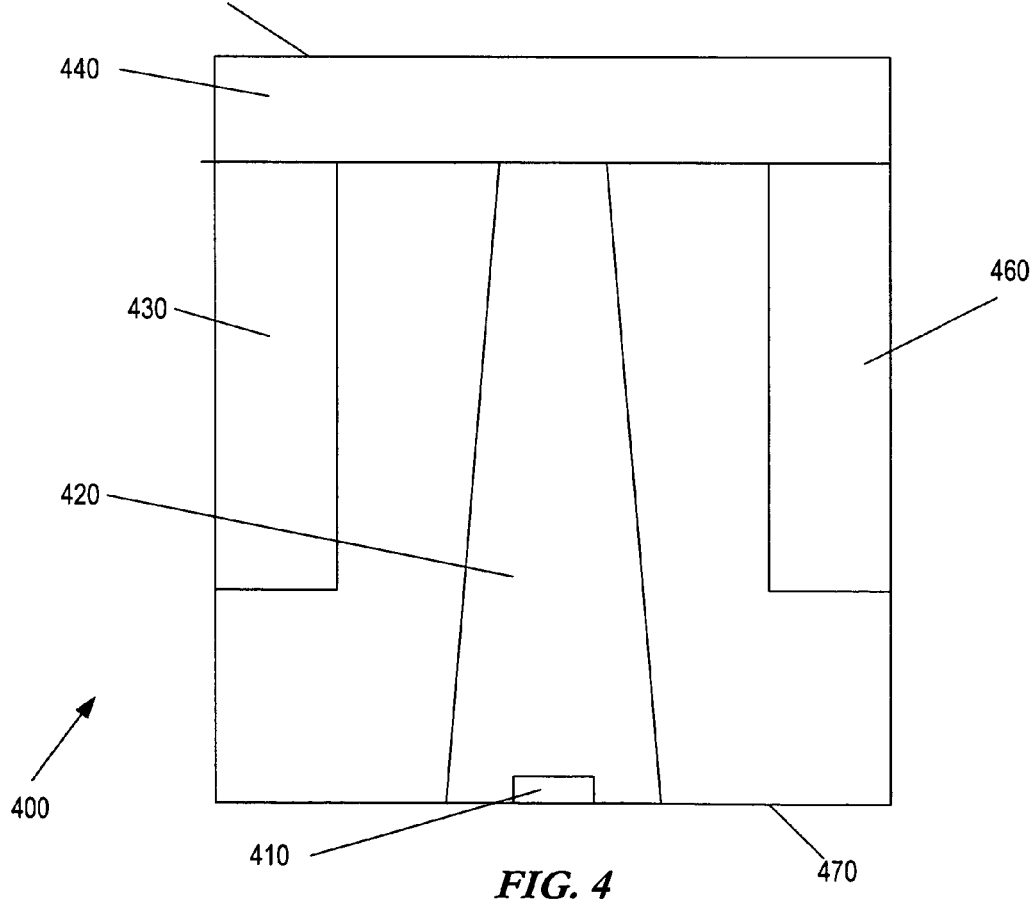
FIG. 4 illustrates an ABS view of the slider and the magnetic head.

FIG. 4 is an ABS view of slider 400 and magnetic head 410. The slider has a center rail 420 that supports the magnetic head 410, and side rails 430 and 460. The support rails 420, 430 and 460 extend from a cross rail 440. With respect to rotation of a magnetic disk, the cross rail 440 is at a leading edge 450 of slider 400 and the magnetic head 410 is at a trailing edge 470 of slider 400.

The above description of a typical magnetic recording disk drive system, shown in the accompanying FIGS. 1–4, are for presentation purposes only. Disk drives may contain a large number of disks and actuators, and each actuator may support a number of sliders. In addition, instead of an air-bearing slider, the head carrier may be one which maintains the head in contact or near contact with the disk, such as in liquid bearing and other contact and near-contact recording disk drives.

Figure 5A:
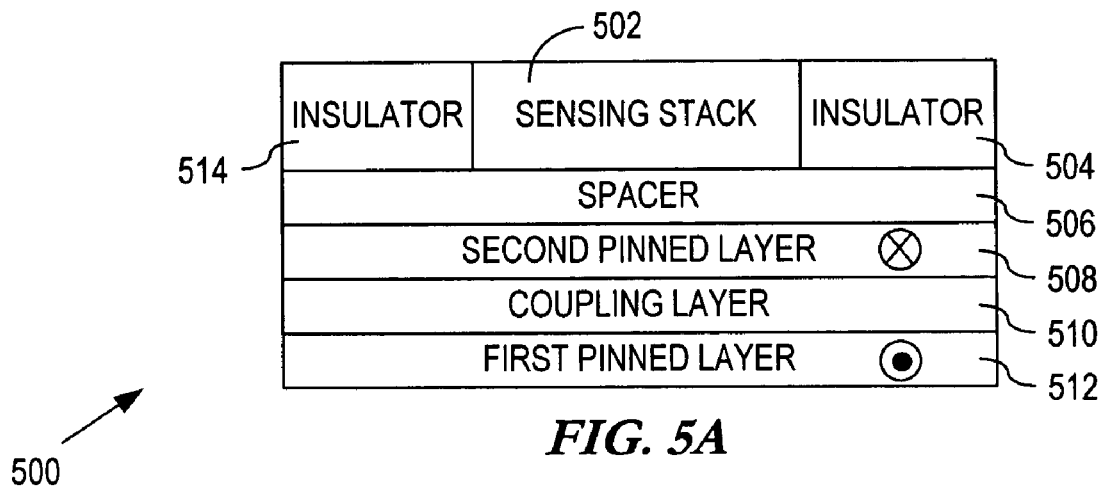
FIGS. 5A and 5B illustrate exemplary Current Perpendicular to Plane (CPP) Giant Magneto-Resistive (GMR) head sensors in accordance with the present invention.

FIG. 5A illustrates an exemplary ABS view of CPP GMR head sensor 500 in accordance with one embodiment of the present invention, excluding the shield, seed, and cap layers typically found with GMR structures. Sensing stack layer 502 is in contact with spacer layer 506, but due to the width difference between sensing stack layer 502 and spacer layer 506, the amount of surface area contact between the two layers is diminished. Second pinned layer 508 and first pinned layer 512 each have equal widths as compared to spacer 506 and are separated by coupling layer 510, which may be composed of a thin layer of a refractory metal, such as Ru. Insulator layers 504 and 514 are in contact with the sides of sensing stack layer 502 and portions of the top side of spacer layer 506.

It can be seen that the width of layers 506–512 are extended beyond the width, or active portion, of sensing stack 502, thus increasing the magnetic stability of CPP GMR head structure 500 and its magnetoresistive signal producing ability. In general, the width of sensing stack 502 must be diminished in order to coincide with the diminished track width of the magnetic storage medium (not shown), but the width of the first and second pinned layers 512 and 508 is not diminished. Rather, the width of first and second pinned layers 512 and 508 is made to be wider than the width of sensing stack 502, in order to realize the advantages of the present invention.

The magnetic stability of first and second pinned layers is directly proportional to their volume. In other words, when the volume of the pinned layers shrinks, the total magnetic anisotropic field between them also shrinks because the total magnetic anisotropic field is directly proportional to the total volume of the pinned layers. Accordingly, as their volume shrinks, the pinned layers become more susceptible to thermal asperities that may cause their magnetic orientations to reverse. Thus, by maintaining the volume of the pinned layers constant while shrinking the width of sensing stack 502, there is no corresponding reduction in magnetic stability of the pinned layers.

It should be noted that in a first embodiment, second pinned layer 508 and first pinned layer 512 are self-pinned. Coupling occurs due to the intrinsic properties of the pinned and coupling layers, such as the positive magnetostriction and compressive stress properties provided by the pinned layer composition, e.g., CoFe. Coupling layer 510 negatively couples second pinned layer 508 and first pinned layer 512 such that they are oppositely magnetized in the manner of an anti-ferromagnet. The magnetic orientations of the first and second pinned layers 512 and 508 are anti-parallel to one another and are perpendicular to the ABS as illustrated.

The effective anisotropy field of the three layer structure, i.e., layers 508–512, is inversely proportional to the difference between the thickness of first pinned layer 512 and second pinned layer 508. Accordingly, when the thickness of pinned layers 508 and 512 is made to be equal, the effective anisotropy field of the three layer structure may be maximized.

In a second embodiment, the use of a thicker, e.g., greater than 100 angstroms, AFM layer (not shown) below second pinned layer 512 may be used. The effect of using the AFM layer is to exchange couple the first pinned layer to the AFM layer, while utilizing second pinned layer 508 as the reference layer for the spin valve. Using the AFM layer, however, lengthens the read gap of the CPP GMR structure 500 and may not be desirable in some implementations.

Figure 5B:
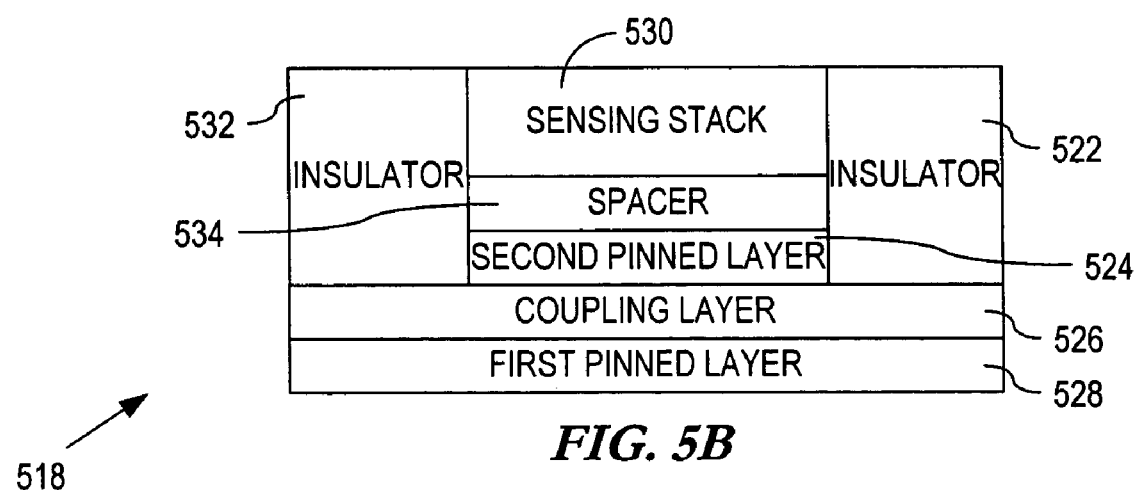

FIG. 5B illustrates an ABS view of an alternative CPP GMR head sensor 518 in accordance with another embodiment of the present invention, excluding the shield, seed, and cap layers typically found with GMR structures. Sensing stack layer 530 is in contact with spacer layer 534, which is in contact with second pinned layer 524. Second pinned layer 524 is in contact with coupling layer 526, but due to the width difference between second pinned layer 524 and coupling layer 526, the amount of surface area contact between the two layers is diminished. Insulator layers 532 and 522 are in contact with side portions of sensing stack layer 530, spacer layer 534, and second pinned layer 524, as well as with top portions of coupling layer 526.

Sputtering techniques may be used to create the multilayer, CPP GMR structures as shown in FIGS. 5A and 5B. Once all layers are in place, etching is performed, either through the use of ion milling or through the use of chemical mechanical polishing, to accommodate the insulator layers. Aluminum oxide, for example, may be used for insulator layers 514, 504, 532, and 522 and may be deposited using a lift off process. In a first embodiment according to the present invention as shown in FIG. 5A, the insulator layers 514 and 504 extend down to spacer layer 506. In a second embodiment according to the present invention as shown in FIG. 5B, the insulator layers 532 and 522 extend down to coupling layer 526.

Figure 6A:
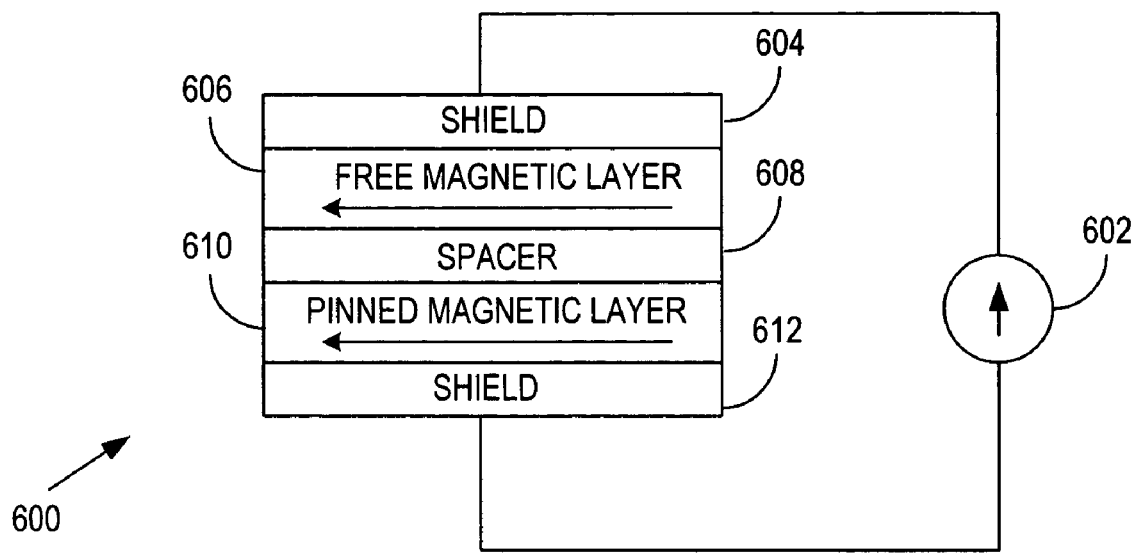
FIGS. 6A and 6B illustrate basic GMR sensor operation.
Figure 6B:
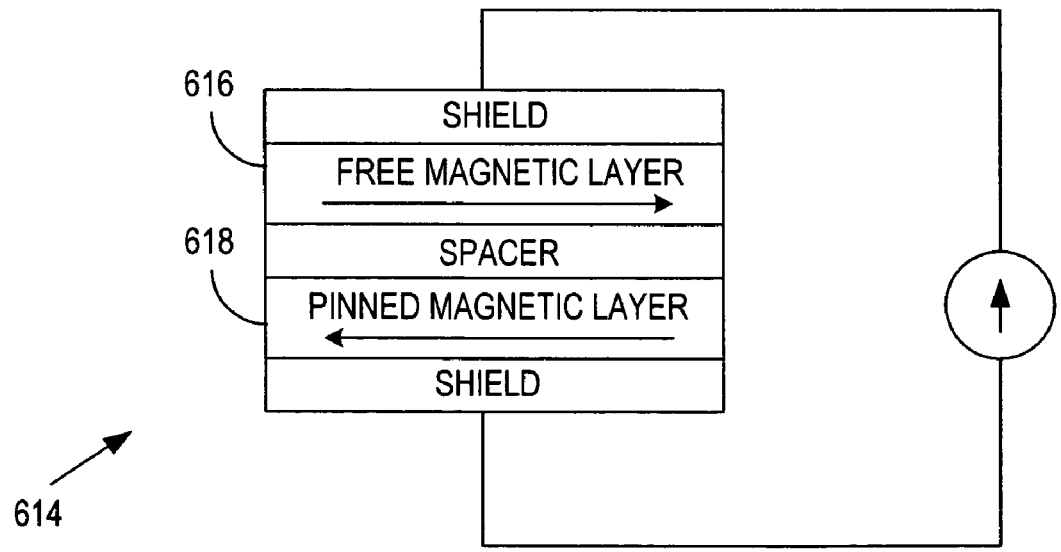

CPP GMR head structures 500 and 518 are multi-layer structures exhibiting a GMR effect, whereby a large change in resistance is measured depending upon the relative magnetic orientations of the ferromagnetic layers within the multilayer as illustrated by FIGS. 6A and 6B. FIG. 6A illustrates basic CPP GMR head 600 that is in a parallel configuration, whereas FIG. 6B illustrates basic CPP GMR head 614 having an anti-parallel configuration. The parallel configuration is defined when the magnetic orientations of the free magnetic layer and the pinned magnetic layer are in the same direction, whereas the anti-parallel configuration is defined when the magnetic orientations of the free magnetic layer and the pinned magnetic layer are in opposite directions. In both configurations, shields 604 and 612 act as terminals that are used to couple to sense current source 602, whereby the sense current passes orthogonally through each surface of the multilayer.

Free magnetic layers 606 and 616, have their respective magnetic orientations set by the magnetic field induced by the magnetic media being read. If a logic "1" has been recorded on the magnetic media, where for example a logic "1" indicates the presence of a magnetic field, then the magnetic orientation of free magnetic layer 606 shown in FIG. 6A may result, thus producing the parallel magnetic configurations of ferromagnetic layers 606 and 610. If a logic "0", on the other hand, has been recorded on the magnetic media, e.g., the lack of a magnetic field, then the anti-parallel magnetic configurations of ferromagnetic layers 616 and 618 as shown in FIG. 6B may result.

The GMR effect can thus be summarized by the relative magnetic orientations of free magnetic layer 606 and 616 to the respective pinned magnetic layers as illustrated by FIGS. 6A and 6B. On the one hand, FIG. 6A represents a parallel magnetic orientation, which results in a low impedance state of CPP GMR 600. Sense current 602 conducted by the low impedance of CPP GMR 600, therefore, results in a low voltage developed across the shield terminals that may be detected by a volt meter (not shown). On the other hand, the anti-parallel magnetic orientation shown in FIG. 6B, represents a high impedance state of CPP GMR 614, resulting in a high voltage measurement across the shield terminals. Thus, by detecting the voltage differences induced by the relative parallel and anti-parallel magnetic orientations of the free layer and pinned layers, logic values read from the magnetic media may be ascertained.

Figure 7:
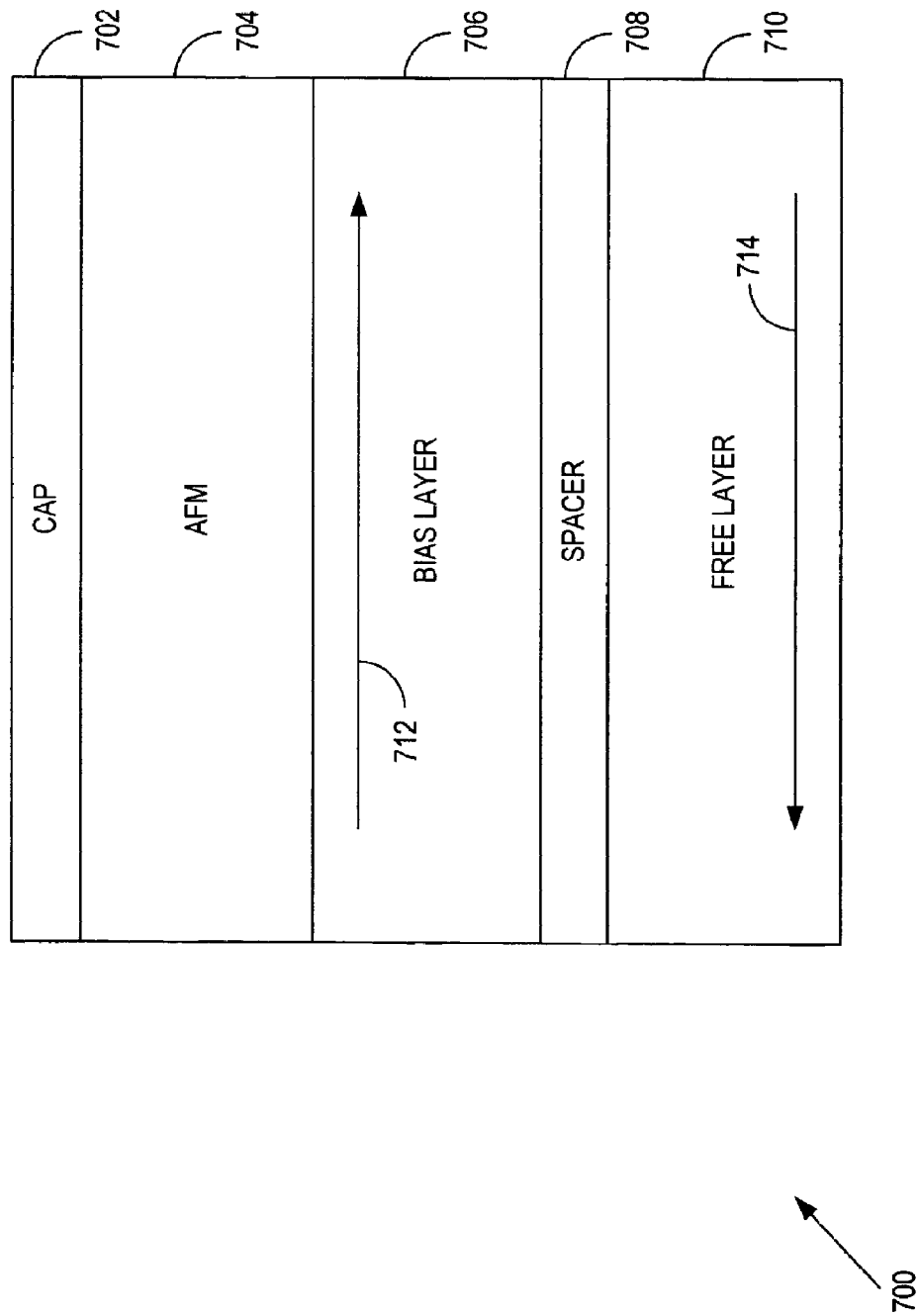
FIG. 7 illustrates an exemplary sensing stack according to the present invention.

FIG. 7 illustrates exemplary sensing stack 700 according to the present invention, which illustrates the composition of sensing stacks 502 and 530 as illustrated in FIGS. 5A and 5B. Cap layer 702 is in contact with AFM layer 704, which is in contact with bias layer 706. Spacer layer 708 separates bias layer 706 from free layer 710. The thickness of bias layer 706 is preferably as thick, or thicker, than that of free layer 710. Bias layer 706 is exchange coupled to AFM layer 704 such that magnetic moment 712 is parallel to the ABS as shown. Spacer 708 may be composed of Ru, but may also be composed of, for example, Cu or Tu. Free layer 708 may be composed of a single layer of CoFe, or alternatively, may be composed of a bi-layer of CoFe/NiFe, where the CoFe layer forms the bottom layer, which is in contact with spacer 506 or 534, as shown in FIGS. 5A and 5B, respectively. Magnetic moment 714 of free layer 708 is pinned anti-parallel to magnetic moment 710 of bias layer 704.

Bias layer 706 provides stabilizing bias to free layer 710, whereby the combination of bias layer 706 and free layer 710 creates a flux closed structure. That is to say that bias layer 706, acting as a small permanent magnet when it is pinned, creates magnet flux lines in accordance with the right hand rule. Free layer 710, which is magnetized anti-parallel to bias layer 706, creates magnetic flux lines in opposition to the flux lines created by bias layer 706. Thus, no stray fields will be produced because there exist no free poles at the ends of bias layer 706 and free layer 710, since they have been cancelled out.

Figure 8:
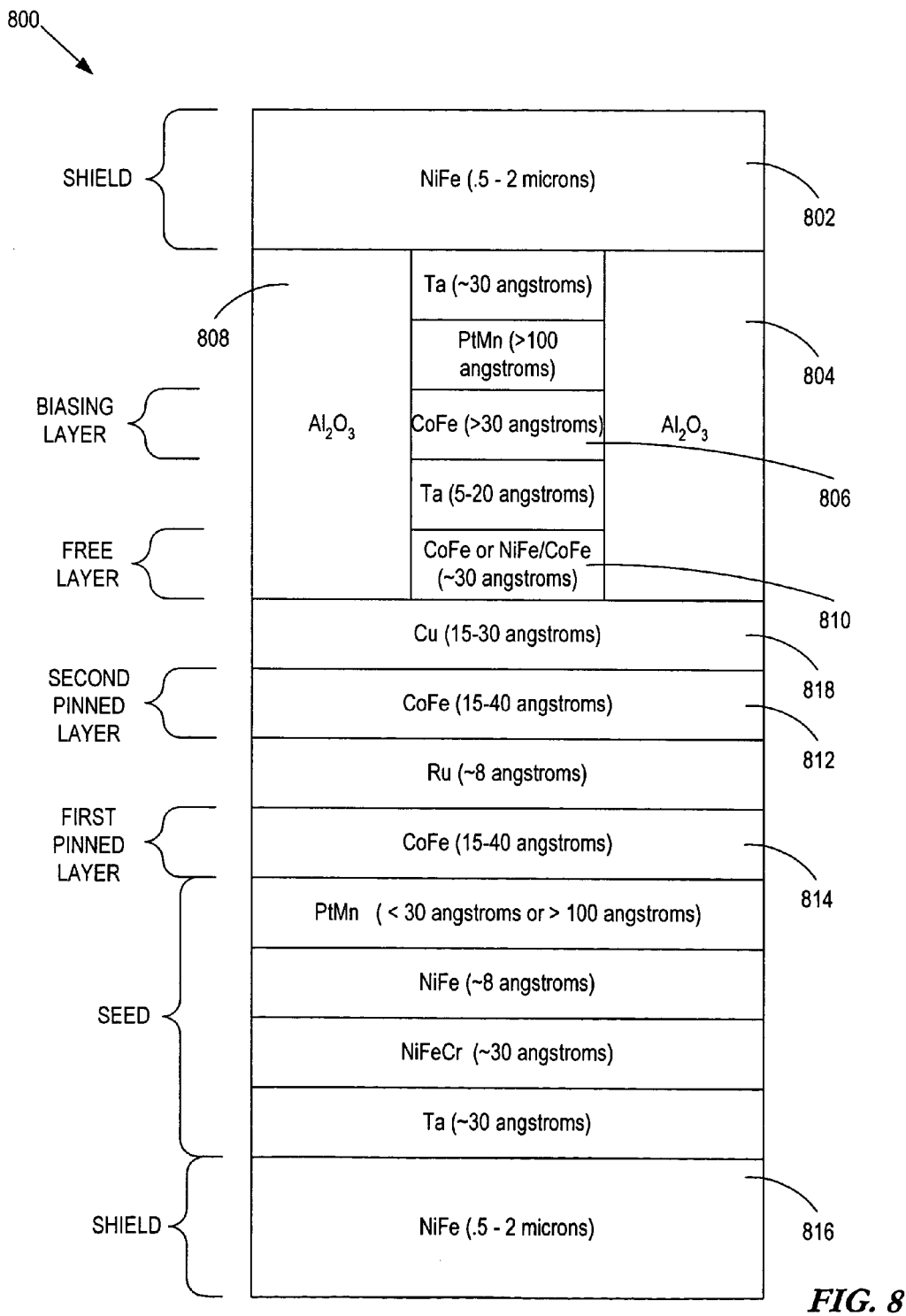
FIG. 8 illustrates an exemplary embodiment of a CPP GMR structure according to the present invention.

FIG. 8 illustrates one embodiment of exemplary CPP GMR structure 800 in accordance with the present invention, where exemplary layer compositions and their corresponding thickness are listed for each layer. CPP GMR structure 800 is bounded on both ends by shields 802 and 816 having, for example, NiFe composition at a thickness of between 0.5 to 2 microns.

The seed layer is comprised of approximately 30 angstroms of Ta, followed by approximately 30 angstroms of NiFeCr, followed by approximately 8 angstroms of NiFe. In one embodiment according to the present invention, the next layer is made up of less than 30 angstroms of PtMn, whereby first pinned layer 814 and second pinned layer 812 are self-pinned as discussed in relation to FIGS. 5A and 5B. In another embodiment according to the present invention, the PtMn layer is greater than 100 angstroms in thickness, whereby first pinned layer 814 is exchange coupled to the PtMn layer and second pinned layer 812 provides the reference layer. The PtMn layer may also be made up of, for example, IrMn, at a thickness of between 40 to 80 angstroms. First pinned layer 814 and second pinned layer 812 should be made to have substantially equivalent thickness between 15 and 40 angstroms and separated by approximately 8 angstroms of Ru.

Spacer 818 is composed of between 15 and 30 angstroms of Cu separating second pinned layer 812 from free layer 810. In one embodiment according to the present invention, $Al_2O_3$ or MgO barrier layers with thickness in the range of 3–6 angstroms may also be used for spacer 818, such that the sensor operates as a magnetic tunneling sensor.

In one embodiment according to the present invention, free layer 810 is made up of a single layer of CoFe having an approximate thickness of 30 angstroms. In another embodiment according to the present invention, free layer 810 is made up of a bi-layer of NiFe and CoFe, whereby the CoFe layer is adjacent to barrier 818. Biasing layer 806 is made up of greater than 30 angstroms of CoFe below between 100 and 200 angstroms of PtMn. IrMn may be used instead of PtMn at a thickness of about 40–80 angstroms. The thickness of biasing layer 806 should be held greater to, or at least equal to, the thickness of free layer 810. Approximately 30 angstroms of Ta follows to form the cap of the structure, just below second shield 802.

It should be noted that milling, followed by the subsequent application of $Al_2O_3$ layers 808 and 804, is only taken down to barrier 818, thus increasing the current density conducted by free layer 810 as compared to the current density conducted by second pinned layer 812. As discussed earlier, a voltage difference is detected across shields 802 and 816 in relation to the change in magnetoresistance that is created by the electron scattering between free magnetic layer 810 and second pinned layer 812 across barrier 818. The voltage difference, $\Delta V$, is proportional to the resistance change, $\Delta R$, according to the following relation: $\Delta V \sim I_S * \Delta R$, where $I_S$ is the sense current flowing through free layer 810 and second pinned layer 812. The magnetoresistance signal, or $\Delta R$, is being generated between free layer 810 and second pinned layer 812 according to the respective magnetic moments between the two layers as discussed in relation to FIGS. 6A and 6B. However, the amount of $\Delta R$ generated is reduced by the reduction in current density through second pinned layer 812.

Figure 9:
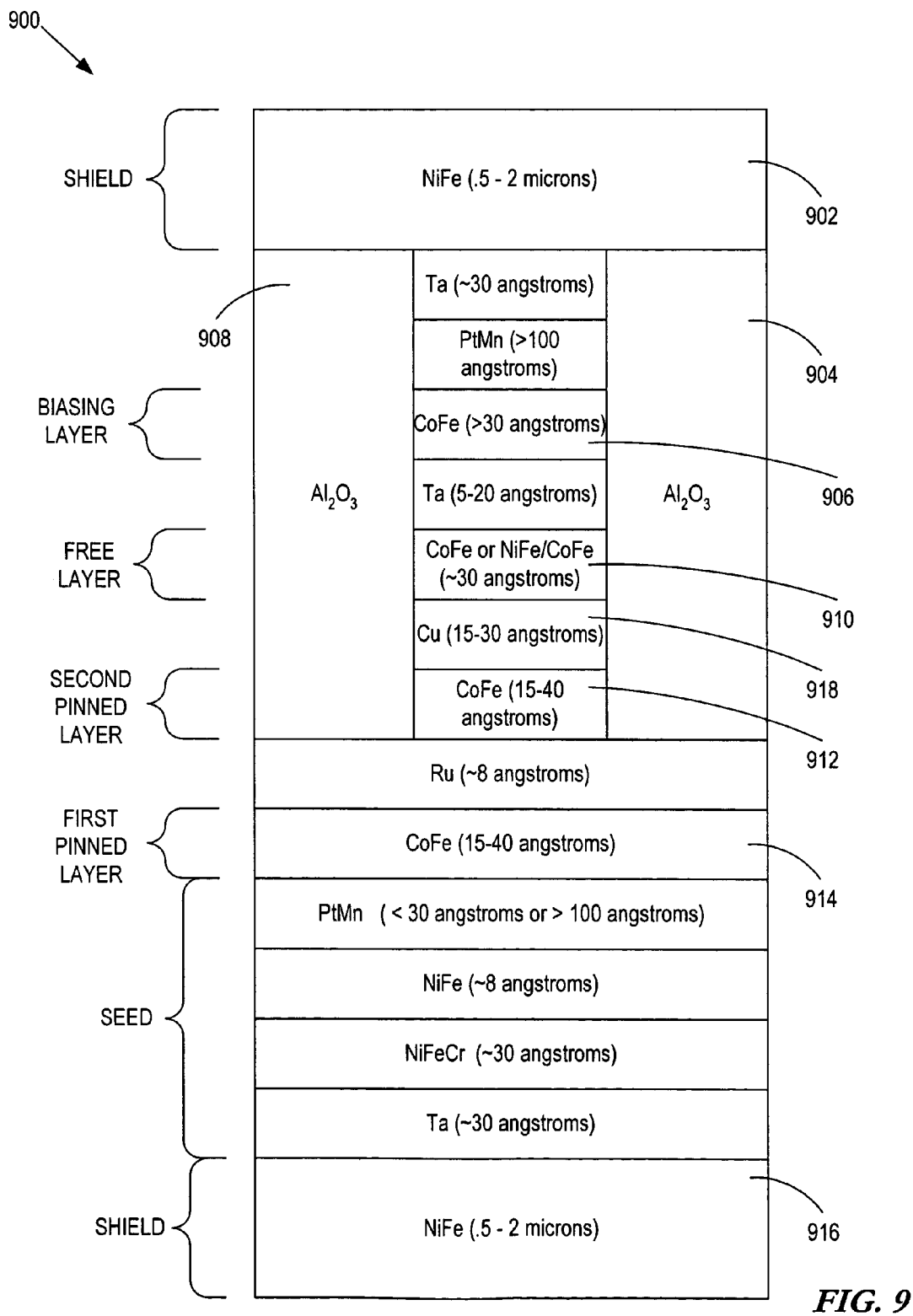
FIG. 9 illustrates an alternate embodiment of a CPP GMR structure according to the present invention.

FIG. 9 illustrates another embodiment of exemplary CPP GMR structure 900 in accordance with the present invention, that exhibits increased $\Delta R$. CPP GMR structure 900 is bounded on both ends by shields 902 and 916 having, for example, NiFe composition at a thickness of between 0.5 to 2 microns.

The seed layer is comprised of approximately 30 angstroms of Ta, followed by approximately 30 angstroms of NiFeCr, followed by approximately 8 angstroms of NiFe. In one embodiment according to the present invention, the next layer is made up of less than 30 angstroms of PtMn, whereby first pinned layer 914 and second pinned layer 912 are self-pinned as discussed in relation to FIGS. 5A and 5B. In another embodiment according to the present invention, the PtMn layer is greater than 100 angstroms in thickness, whereby first pinned layer 914 is exchange coupled to the PtMn layer and second pinned layer 912 provides the reference layer. The PtMn layer may also be made up of, for example, IrMn, at a thickness of between 40 and 80 angstroms. First pinned layer 914 and second pinned layer 912 should be made to have substantially equivalent thickness between 15 and 40 angstroms and separated by approximately 8 angstroms of Ru.

Spacer 918 is composed of between 15 and 30 angstroms of Cu separating second pinned layer 912 from free layer 910. In one embodiment according to the present invention, $Al_2O_3$ or MgO barrier layers with thickness in the range of 3–6 angstroms may also be used for spacer 918, such that the sensor operates as a magnetic tunneling sensor.

In one embodiment according to the present invention, free layer 910 is made up of a single layer of CoFe having an approximate thickness of 30 angstroms. In another embodiment according to the present invention, free layer 910 is made up of a bi-layer of NiFe and CoFe, whereby the CoFe layer is adjacent to barrier 918. Biasing layer 906 is made up of greater than 30 angstroms of CoFe below between 100 and 200 angstroms of PtMn. IrMn may be used instead of PtMn at a thickness of about 40–80 angstroms. The thickness of biasing layer 906 should be held greater to, or at least equal to, the thickness of free layer 910. Approximately 30 angstroms of Ta follows to form the cap of the structure, just below second shield 902.

A particular advantage of CPP GMR structure 900 over that of CPP GMR structure 800 is achieved by increasing the amount of magnetoresistance signal, or $\Delta R$, that is produced. It should be noted that the width of second pinned layer 912 is substantially equal to the width of free layer 910. This condition is implemented by milling down through barrier 912, followed by subsequent application of $Al_2O_3$ layers 908 and 904. In such an embodiment, the current density conducted by free layer 910 and second pinned layer 912 is equivalent. Therefore, the amount of magnetoresistance signal, or $\Delta R$, is maximized because current density has not been decreased through the magnetoresistance producing layers, i.e., free layer 910 and second pinned layer 912. Further, $\Delta R$ increase is realized by maintaining the original width of first pinned layer 914, thus reducing its relative current density, thus reducing its negative contribution of $\Delta R$.

As mentioned above, the present invention provides a method and apparatus for providing enhanced magnetoresistance signal generation, increased pinning strength, and increased thermal stability due to the extended pinned layer structure. The structure also provides robust behavior when exposed to Electro-Static Discharge (ESD) events because the current density in the pinned layer is reduced by its extended structure, thereby reducing the temperature increase caused by the ESD event.

According to the present invention, the fields of computers and magnetic data storage and recovery are improved by the formation a CPP GMR sensor as disclosed herein. Thus, the present invention improves not only the field of GMR sensors, but also the entire field of computers and magnetic data storage and retrieval.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method of forming a spin valve sensor, comprising:
    forming a first pinned layer with a top surface, bottom surface and sides orthogonal to the top and bottom surface and having a first magnetic orientation and a first width;
    forming a second pinned layer with sides orthogonal to the top and bottom surface of the first pinned layer and having a second magnetic orientation anti-parallel to the first magnetic orientation and a second width;
    forming a sensing layer with sides orthogonal to the top and bottom surface of the first pinned layer and having a third width smaller than the first width; and
    forming a spacer layer with sides orthogonal to the top and bottom surface of the first pinned layer and having a width equal to the second width;
    wherein the third width is selected to coincide with a predetermined track width, the first width being selected to be wider than the predetermined track width.

2. The method according to claim 1, further comprising forming a coupling layer disposed between the first and second pinned layers.

3. The method according to claim 2, wherein the first and second pinned layers are formed with substantially equal thickness.

4. The method according to claim 3, wherein forming the first and second pinned layers creates self-pinned magnetic orientations.

5. The method according to claim 3, further comprising depositing an anti-ferromagnetic material (AFM) adjacent to the first pinned layer, wherein a thickness of the AFM creates exchange coupling between the AFM and the first pinned layer.

6. The method according to claim 1, wherein forming the sensing layer includes:
    forming a free layer having a third magnetic orientation orthogonal to the first and second magnetic orientations;
    forming a bias layer in proximity to the free layer having a fourth magnetic orientation anti-parallel to the third magnetic orientation; and
    forming an AFM layer adjacent to the bias layer, wherein exchange coupling between the AFM layer and the bias layer sets the fourth magnetic orientation.

7. The method according to claim 6, wherein the bias layer is formed with a thickness greater than a thickness of the free layer.

8. The method according to claim 1, wherein the second pinned layer is formed with a width substantially equal to the third width.

9. The method according to claim 8, wherein insulating layers are disposed on both sides of the second pinned layer.

10. The method according to claim 1, wherein the second pinned layer is formed with a width substantially equal to the first width.

11. The method according to claim 1, wherein insulating layers are disposed on both sides of the sensing layer.

* * * * *